(12) United States Patent
Gruen

(10) Patent No.: US 6,310,830 B1
(45) Date of Patent: Oct. 30, 2001

(54) ENVIRONMENTALLY ADAPTIVE SONAR SYSTEM

(75) Inventor: Henry M. Gruen, Arnold, MD (US)

(73) Assignee: Northtrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/545,243

(22) Filed: Apr. 7, 2000

(51) Int. Cl.[7] .................................................. G01S 15/89
(52) U.S. Cl. ................................................................ 367/88
(58) Field of Search ............................... 367/88, 11, 125, 367/126, 165, 122, 119, 103, 105, 138

(56) References Cited

U.S. PATENT DOCUMENTS 3,922,634 * 11/1975 Warner .................................. 367/125

* cited by examiner

Primary Examiner—Daniel T. Pihulic

(57) ABSTRACT

The vertical beamwidth of the received beam of a return signal of a sonar system is adaptively modified as a function of water depth, altitude and range. The received beam is also vertically steered as a function of altitude and is steered at least once prior to the adaptive modification of the beamwidth. The vertical aperture is thereafter grown as a function of range by increasing the number selected elements in the hydrophone array. This is achieved by dynamically controlling a vertical beamformer by controlling the number of elements selected and the vertical steering angle in response to sensors which provide, among other things, data as to water depth, altitude or sonar depth, platform dynamics, and sonar range/time.

12 Claims, 3 Drawing Sheets

ENVIRONMENTALLY ADAPTIVE SONAR SYSTEM

BACKGROUND OF THE INVENTION

1. Field of the Invention

This invention relates generally to sonar apparatus and more particularly to a sonar system which adaptively modifies its vertical beamwidth and steering angle in accordance with the water depth in which it is operating so as to maximize the range at which detection and classification of underwater targets is possible.

2. Description of Related Art

The shift in emphasis from blue water to the littoral naval operations has increased the importance of capably detecting targets, such as mines, in shallow waters. However, detecting and classifying these targets, particularly mines in shallow water, is complicated by the proximity of the boundaries within which the target threat is found. In the case of Very Shallow Water (VSW), ranging from 10 feet to 40 feet water depth, the extreme proximity of the sea surface and bottom result in highly reverberant, multi-path environment with severe impact on the operation of conventional mine-hunting sonars, such as side looking sonars (SLS).

As sonar range potential increases due to technical advances such as Synthetic Aperture Sonar (SAS), the effect of boundary reverberation and multi-path is extended to deeper waters in the same way that the VSW affects state of the art sonar systems, i.e. as range is extended, deeper waters will tend to exhibit the same limitations as "shallow" water. Although particularly directed to VSW, the technique which will be disclosed hereinafter is also applicable to water depths that are substantially in excess of those found in the VSW environment. To regain a substantial measure of performance enjoyed in deeper water and to increase the search rate to acceptable levels, similar arrays must be modified to operate in this environment.

The basic problem associated with the VSW environment, or in water depths that are shallow with respect to sonar range, is depicted in FIG. 1. As shown in FIG. 1, a side looking sonar (SLS) 10 is operating against a mine 12 residing on the bottom 14 of a body of water having a surface indicated by reference numeral 16. Both the return sonar signal 18 and the acoustic shadow 20 behind it, where the mine body blocks the acoustic energy from hitting the bottom 14, compete with multi-path 22, and surface reverberation 24 arriving at the same time. Because both detection and classification rely on the target highlight and shadow so as to indicate both mine presence and dimension, operation is compromised.

Two possible methods to combat the adverse effects of the VSW environment include: (a) narrowing the vertical beamwidth to decrease the vulnerability to both multi-path and direct verberation; and (b) the placement of a dynamic null in the vertical beam pattern to counteract direct surface verberation. In the latter case, both the geometry of the situation and the sound velocity has to be known to enable the null to track the expected source point of the surface reverberation. In the multi-path environment, however, a null directed at the surface will not remove all the interfering paths. Accordingly, the approach chosen in the subject invention is to dynamically narrow the vertical beamwidth until sufficient gain is achieved against interference.

SUMMARY

Accordingly, it is an object of the present invention to provide an improved method and apparatus for detecting and classifying underwater targets.

It is a further object of the invention to provide an improved method and apparatus for detecting and classifying targets in shallow waters.

It is also an object of the present invention to provide an improved method and apparatus for detecting and classifying targets in water depths that are shallow with respect to sonar range.

And yet it is still another object of the invention to provide an improved method and apparatus for detecting and classifying underwater targets such as mines in both very shallow waters and in water depths that are shallow with respect to sonar range.

The foregoing and other objects of the invention are achieved in a sonar system by adaptively modifying the vertical beamwidth of the received beam of a sonar return signal as a function of water depth, altitude and range. The received beam is also vertically steered as a function of altitude and is steered at least once prior to the adaptive modification of the beamwidth. The received vertical beamwidth is made smaller as range increases by growing or enlarging the vertical aperture by increasing the number selected elements in the hydrophone array. This is achieved by dynamically controlling a vertical beamformer by controlling the number of elements selected and the vertical steering angle in response to sensors which provide, among other things, data as to water depth, altitude or sonar depth, platform dynamics, and sonar range/time.

Further scope of applicability of the present invention will become apparent from the detailed description provided hereinafter. It should be understood, however, that the method and apparatus set forth in a detailed description are provided by way of illustration only, since various changes and modifications coming within the spirit and scope of the invention will become apparent to those skilled in the art.

BRIEF DESCRIPTION OF THE DRAWINGS

The present invention will become more fully understood from the detailed description provided and the accompanying drawings which are provided by way of illustration only, and thus are not limitative of the present invention, and wherein.

DETAILED DESCRIPTION OF THE INVENTION

Referring now to FIGS. 2–6, depicted thereat are signal-to-interference ratio (SIR) and shadow contrast ratio (SCR) performance estimates in a multi-path environment. The model used to generate the curves in FIGS. 2–6 is known as the Shallow Water Acoustic Tool Set (SWAT). While these curves are generated for a VSW environment, it is to be understood that the effect as modeled in these figures also pertains to deeper water when the range of the sonar, such as in the use of a synthetic aperture sonar (SAS), is increased in approximate proportion to the water depth. The curves of FIGS. 2–6 were generated under the following conditions:

Water depth=10 feet and 40 feet (to encompass the VSW environment).
Wind speed=20 kn.
SVP=Iso
Bottom type=very fine sand
Sonar frequency=700 kHz
Source level=228 dB/$\mu$Pa
Horizontal beamwidth≈0.075° —Receive
Horizontal sidelobes=−13 dB
Vertical beamwidth=as depicted—Receive and Transmit
Vertical sidelobes=−13 dB
Target =a typical bottom mine The SIR needed to attain a high probability of detection and low false alarm rate is on the order of 15 dB for a single pulse. Because of the process through which a sonar image is obtained with a side-looking sonar (SLS) 10 (FIG. 1), lower SIRs will provide useful imaging capability. The SCR is a measure of how well a target shadow can be distinguished, i.e. detected, and should be about 5 dB minimum to achieve a high probability of classification.

Figure 5:
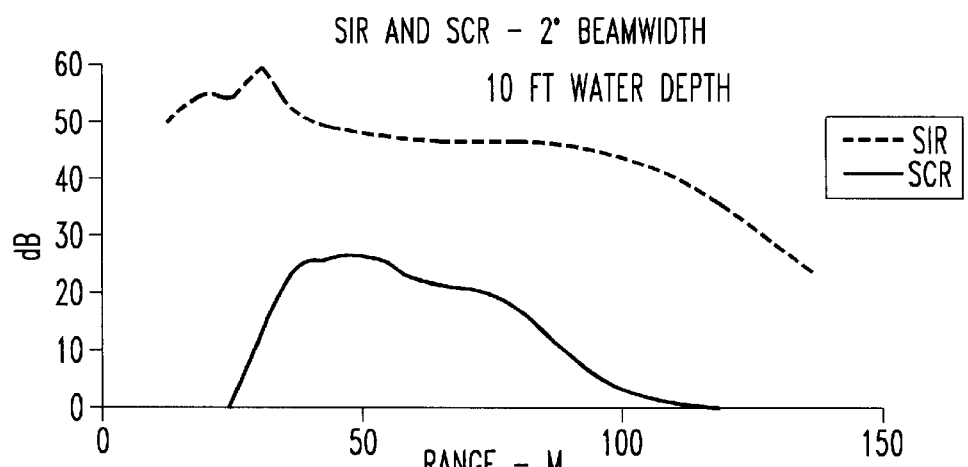

Accordingly, it can be seen with reference to FIGS. 2–5 where vertical beamwidth is narrowed in four (4) increments from 60° to 2°, that while the SIR remains much higher than needed for detection, the SCR decreases as the shadow becomes filled in by surface reverberation and limits classification range. For example, the performance of a 60° vertical received beamwidth greatly compromises performance as evidenced in FIG. 2, which shows useful shadow information being only available up to about 10 meters (M) in range. As the vertical beamwidth is narrowed, performance is shown to improve to about 80 M (FIG. 5).

Figure 6:
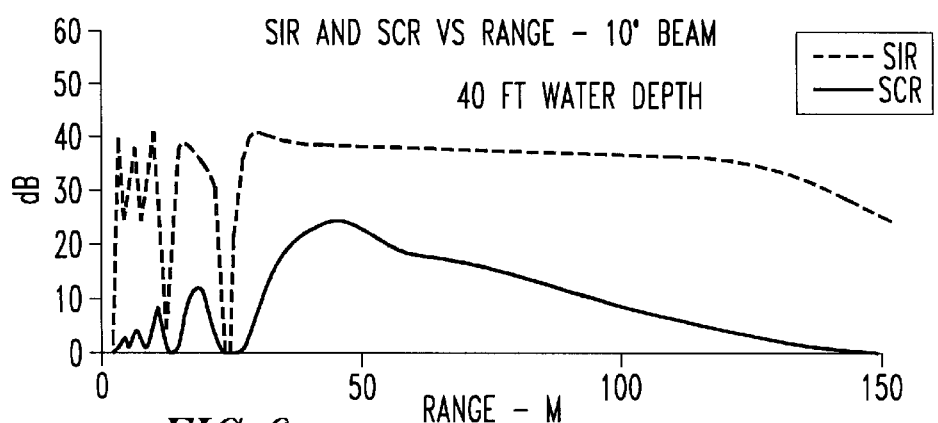
FIG. 6 is a graph illustrative of a performance estimate in 40 feet water depth and a 10° beamwidth.
Figure 7:
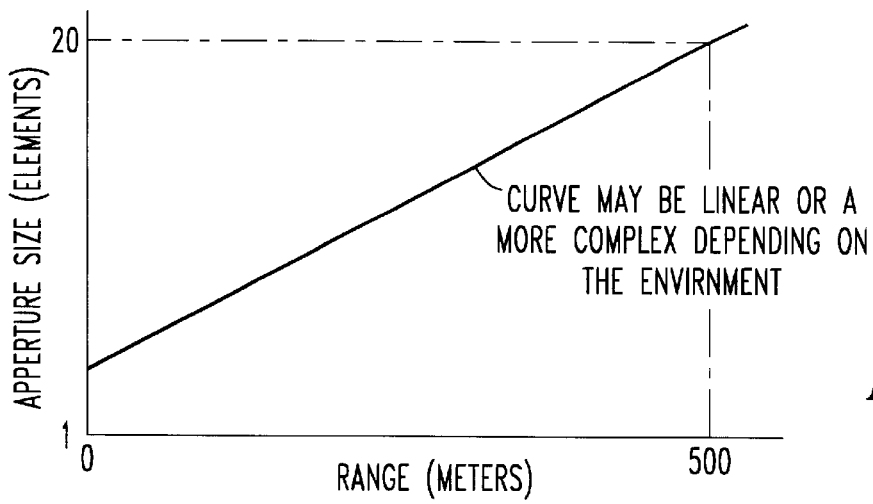
FIG. 7 is a characteristic curve illustrative of aperture size vs. range in accordance with the subject invention.

The graphs reveal, that to operate in 10 feet water depth, the vertical received to beamwidth must be at least as narrow as 2° to maintain reasonable sonar performance out to 80–90 meters. Thus to avoid the effect that narrow beamwidth and sidelobe structures create at short range, in order to maintain a desired coverage in range, the subject invention grows or enlarges the vertical aperture as range increases, as shown in FIG. 7, where the number of elements utilized to detect receives sonar signals is increased linearly with the function of range. This linear function is not meant to be considered in a limiting sense since more complex combinations of elements may be utilized depending upon the environment in which the sonar system operates. At the other end of the VSW environment, where water depth is a more favorable 40 feet, operation is improved as indicated in FIG. 6, with the employment of a 10° vertical beamwidth. In such an instance, it can be seen that range is improved to over 100 meters.

Figure 8:
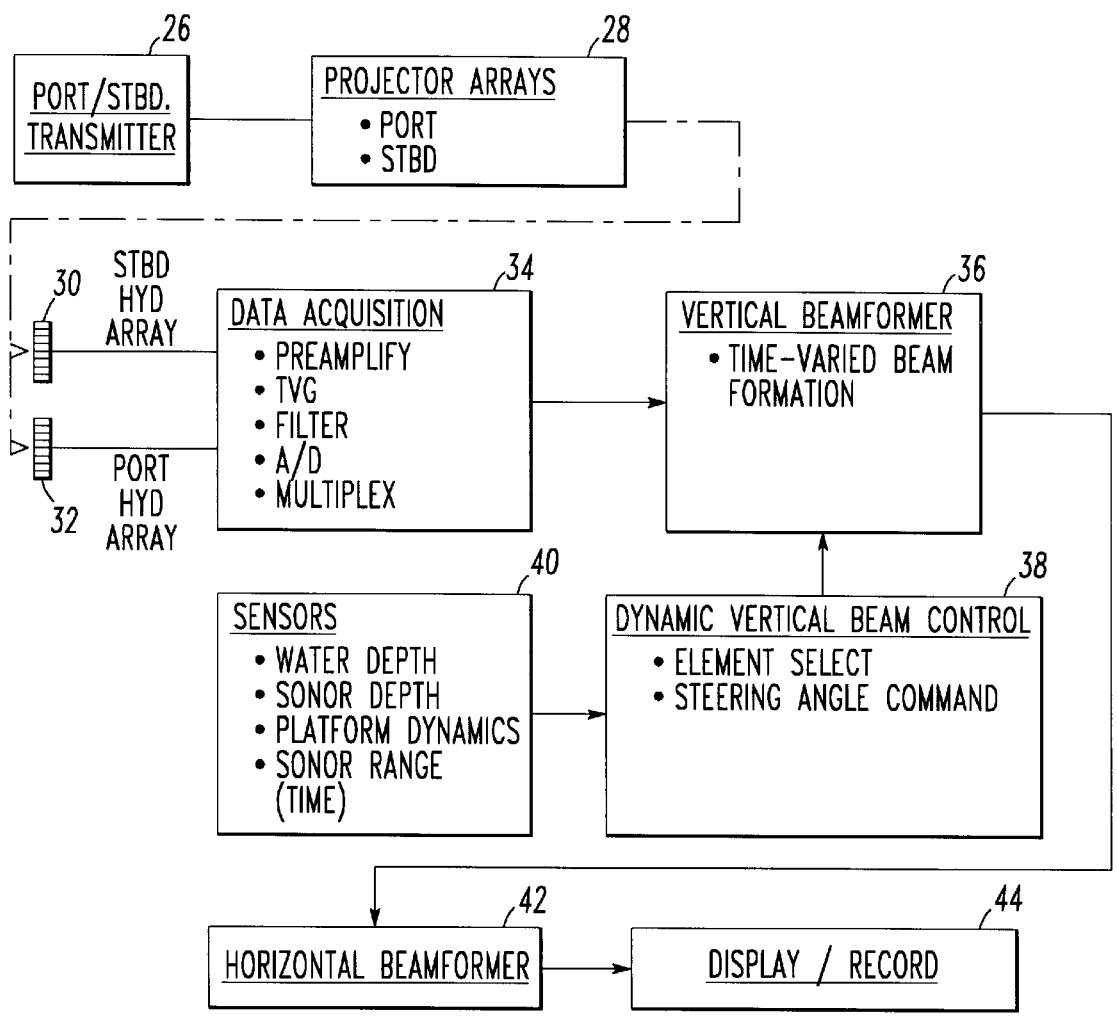
FIG. 8 is an electrical block diagram illustrative of the preferred embodiment of the invention.

Referring now to FIG. 8, shown thereat is a block diagram for implementing the subject invention which in addition to adaptively varying the vertical beamwidth of the received sonar signal by dynamically varying the size of the aperture as a function of detected water depth, altitude and range, also controls the vertical steering angle of the vertical beamwidth at least once as a function of detected altitude prior to varying the vertical beamwidth.

Figure 1:
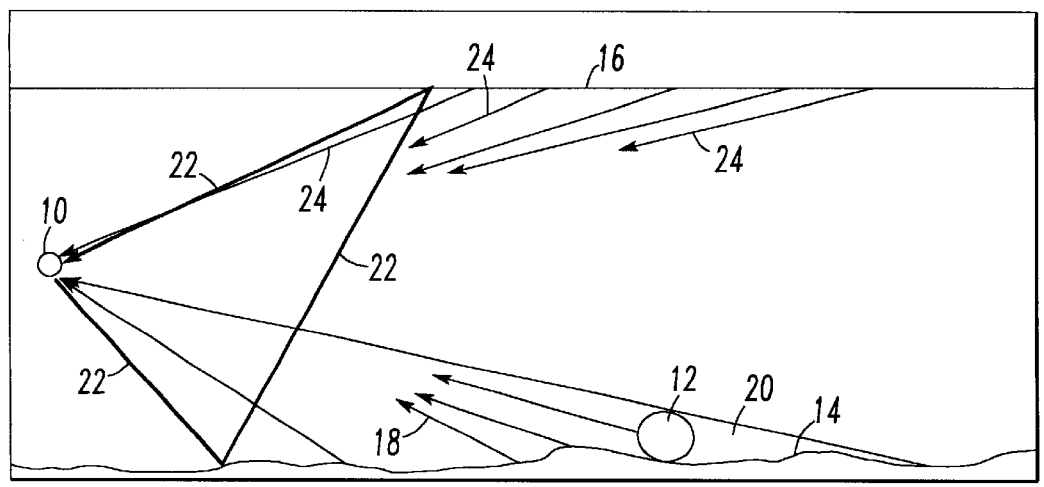
FIG. 1 is a diagram illustrative of the operational environment of the subject invention.
Figure 2:
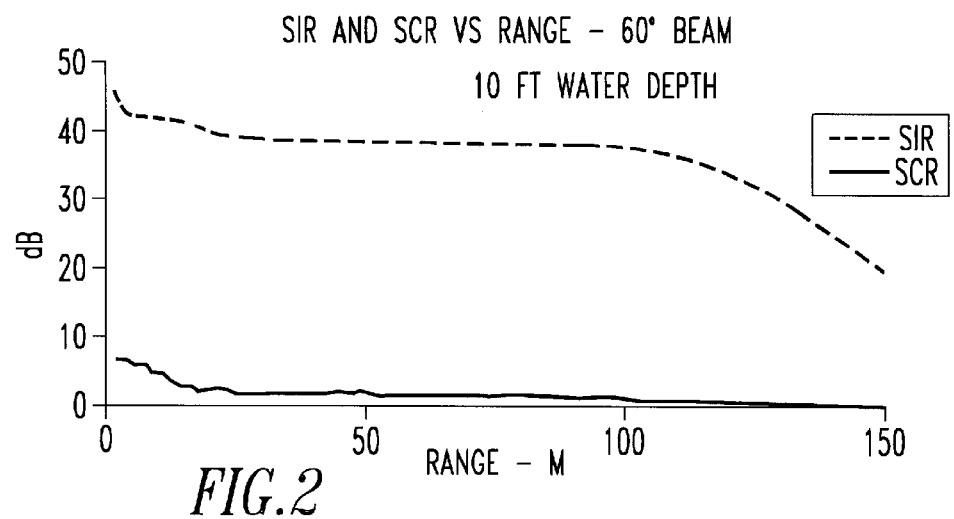
FIGS. 2–5 are directed to a set of graphs depicting performance estimates of signal-to-interference ratio (SIR) and shadow contrast ratio (SCR) vs. range for four different received vertical beamwidths for operation in water having a depth of 10 feet.
Figure 3:
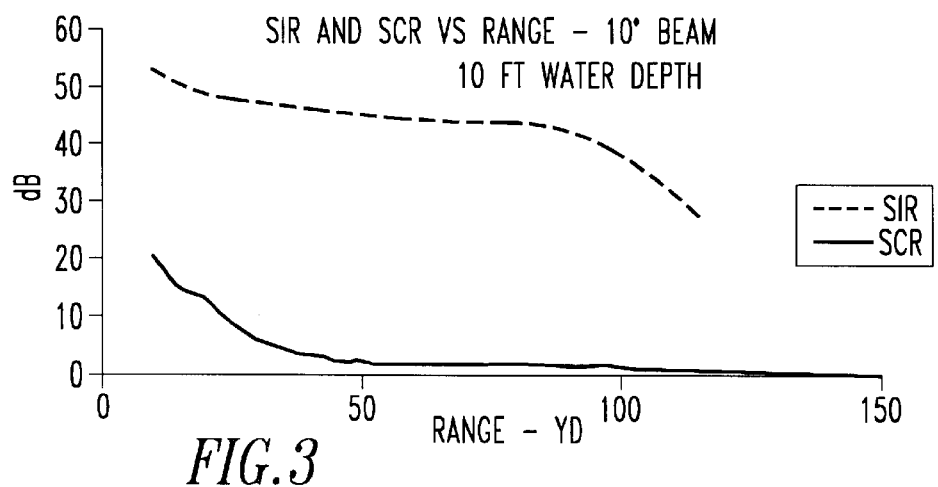
Figure 4:
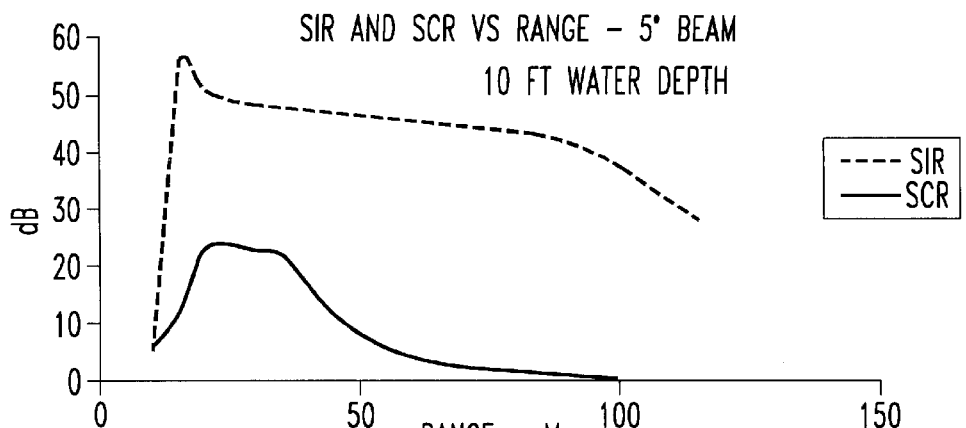

The sonar system 10 shown in FIG. 8 comprises a side look sonar (SLS) including a port and starboard sonar signal transmitter 26 which generates sonic pulses fed to port and starboard projector arrays shown by reference numeral 28. The sonar arrays 28 direct sonar pulses downward to the target area on the bottom of the sea floor as shown in FIG. 1. The reflected energy is received via port and starboard hydrophone arrays 30 and 32, each comprised of a plurality of receiving elements, where the energy is then fed into a data acquisition section 34 which includes circuitry for providing preamplification, time varying gain (TVG), signal filtering, analog to digital (A/D) signal conversion, and multiplexing.

The digital signals converted in the data acquisition section 34 are then first fed to a vertical beamformer section 36 where, under dynamic control of a vertical beam controller section 38, the vertical receive beams are formed. The dynamic vertical beam control section 38 controls the number of hydrophone elements which are selected so as to control aperture size and vertical beamwidth as well as controlling the vertical steering angle of the received beam. The control section 38 functions in response to data generated by a set of sensors 40 which senses water depth, sonar depth, platform dynamics, and instantaneous sonar array range from other vehicle sensors, and timing information based on knowledge of the velocity of sound in the particular water medium.

As noted, the dynamic vertical beam controller 38 determines the number of elements employed in the aperture at any instant in time along with the vertical steering angle. The output of the vertical beamformer section 38 is then fed to a horizontal beamformer where the horizontal and vertical beams are formed in either a conventional manner or in the case of a synthetic aperture sonar (SAS) by an appropriate algorithm.

In the subject invention, the system essentially detects altitude, then sets the vertical angle and selects the number of elements initially used to form a small aperture as a function of water depth. Thereafter, the vertical beamwidth is made to decrease as a function of range or time by increasing the size of the aperture, i.e., increasing the number of elements as shown, for example, in FIG. 7.

An additional consequence of operating in a very shallow water environment is that wave motion can have a significant influence on the platform hosting the sonar 10 (FIG. 1) which may be, for example, a sled being towed by another vehicle. Given that relatively narrow vertical beamwidths must be maintained to operate in the VSW environment, additional vertical steering must be employed to compensate for platform roll. The vertical beam controller section 38 also controls vertical steering angle as a function of platform dynamics in addition to its initial setting as a function of altitude.

Thus having described what is at present considered to be the preferred method and embodiment for practicing the invention, it should be noted that the same has been made by way of illustration and not limitation. Accordingly, all modifications, alterations and changes coming within the spirit and scope of the invention as set forth in the appended claims, are herein meant to be included.

What is claimed is:

1. A method of operating a sonar system, comprising the steps of:
    (a) detecting the water depth and the altitude of the sonar system above the bottom of a body of water;
    (b) generating and transmitting a sonar signal toward the bottom;
    (c) receiving the sonar signal reflected from the bottom and conditioning the reflected signal into a received beam having, a horizontal and vertical beamwidth;
    (d) adaptively varying the vertical beamwidth of said received beam as a function of water depth, altitude and range; and (e) vertically steering the received beam as a function of altitude.

2. A method according to claim 1 wherein the step (d) of adaptively varying vertical beamwidth comprises decreasing the vertical beamwidth as a function of range.

3. A method according to claim 1 wherein the step (d) of adaptively varying the vertical beamwidth comprises increasing the size of the system's aperture as a function of range.

4. A method according to claim 1 wherein the step (e) of vertically steering the transmitted sonar is carried out prior to step (d) of adaptively varying the received vertical beamwidth.

5. A method according to claim 1 wherein the step (e) of steering includes vertically steering the received beam as a function of platform dynamics.

6. A method according to claim 1 wherein the sonar system comprises a side looking sonar or a synthetic aperture sonar.

7. A sonar system mounted on a platform and comprising:
   a transmitter for generating sonar pulses;
   projector apparatus for directing sonar pulses generated by the transmitter toward the bottom of a body of water;
   a hydrophone array for receiving sonar pulses reflected from the bottom and including a plurality of receiving elements, the number of which define an aperture;
   a data acquisition section for processing sonar signals received by the array;
   vertical beamformer apparatus for generating a vertical receive beam from the processed signals;
   a dynamic vertical beam controller responsive to sensed water depth, sonar altitude and range for determining the number of elements utilized in the aperture at any instant in time as well as the vertical steering angle.

8. A sensor system according to claim 7 where the vertical beamwidth generated is initially determined by the sensed altitude and water depth and where the aperture is thereafter enlarged as range increases.

9. A sonar system according to claim 7 where the vertical steering angle is initially determined and set by the sensed altitude.

10. A sonar system according to claim 9 where the vertical steering angle is set prior to the generation of the initial generation of vertical beamwidth.

11. A sonar system according to claim 9 wherein the vertical steering is also controlled by sensed platform dynamics.

12. A sonar system according to claim 7 wherein the sonar system comprises a side looking sonar or a synthetic aperture sonar.

* * * * *